United States Patent [19]

Kordas

[11] 4,367,080
[45] Jan. 4, 1983

[54] PRESSURE-GAS CONNECTION FOR DUST-LADEN GAS FILTERS

[75] Inventor: Friedel Kordas, Recklinghausen, Fed. Rep. of Germany

[73] Assignee: Intensive-Filter GmbH & Co KG, Velbert, Fed. Rep. of Germany

[21] Appl. No.: 166,734

[22] Filed: Jul. 7, 1980

[30] Foreign Application Priority Data

Feb. 12, 1980 [DE] Fed. Rep. of Germany ....... 3005146

[51] Int. Cl.³ ............................................. B01D 46/04
[52] U.S. Cl. ..................................... 55/302; 285/132; 285/137 R
[58] Field of Search ................... 55/293, 302; 239/550, 239/566, 567, 600; 285/132, 137 R

[56] References Cited

U.S. PATENT DOCUMENTS 763,305  6/1904  Merrill ................................ 239/567

FOREIGN PATENT DOCUMENTS 2421846 11/1975 Fed. Rep. of Germany ........ 55/302
202809  2/1939 Switzerland ......................... 239/566
1455281 11/1976 United Kingdom .................. 55/302

*Primary Examiner*—David L. Lacey
*Attorney, Agent, or Firm*—Martin A. Farber

[57] ABSTRACT

A pressure gas connection of a reverse-flow device with the pressure gas feed conduit (2) in dust-laden gas filters is disclosed. The reverse-flow device is formed as a two-stage injector. In dust-laden gas filters which are provided with such a reverse-flow device, each individual injector (1) is connected in a manner which is as gas-tight as possible to the pressure gas feed conduit (2). In order to create a rapidly and easily mountable pressure gas connection for injectors (1) which does not require any additional seals, the connecting sockets (1a) of the injectors (1) of the first stage are inserted over the pressure-gas feed conduit (2) alternating with spacer sleeves (3). A stationary sleeve (4) is inserted over one end of the pressure gas feed conduit (2) and a movable end sleeve (5) is inserted over the other end of the pressure gas feed conduit (2). The movable end sleeve protrudes beyond the pressure gas feed conduit (2) in axial direction and is provided with a clamping device (6) which presses the connecting sockets (1a) and the spacer sleeves (3) in axial direction against the stationary sleeve (4).

7 Claims, 3 Drawing Figures

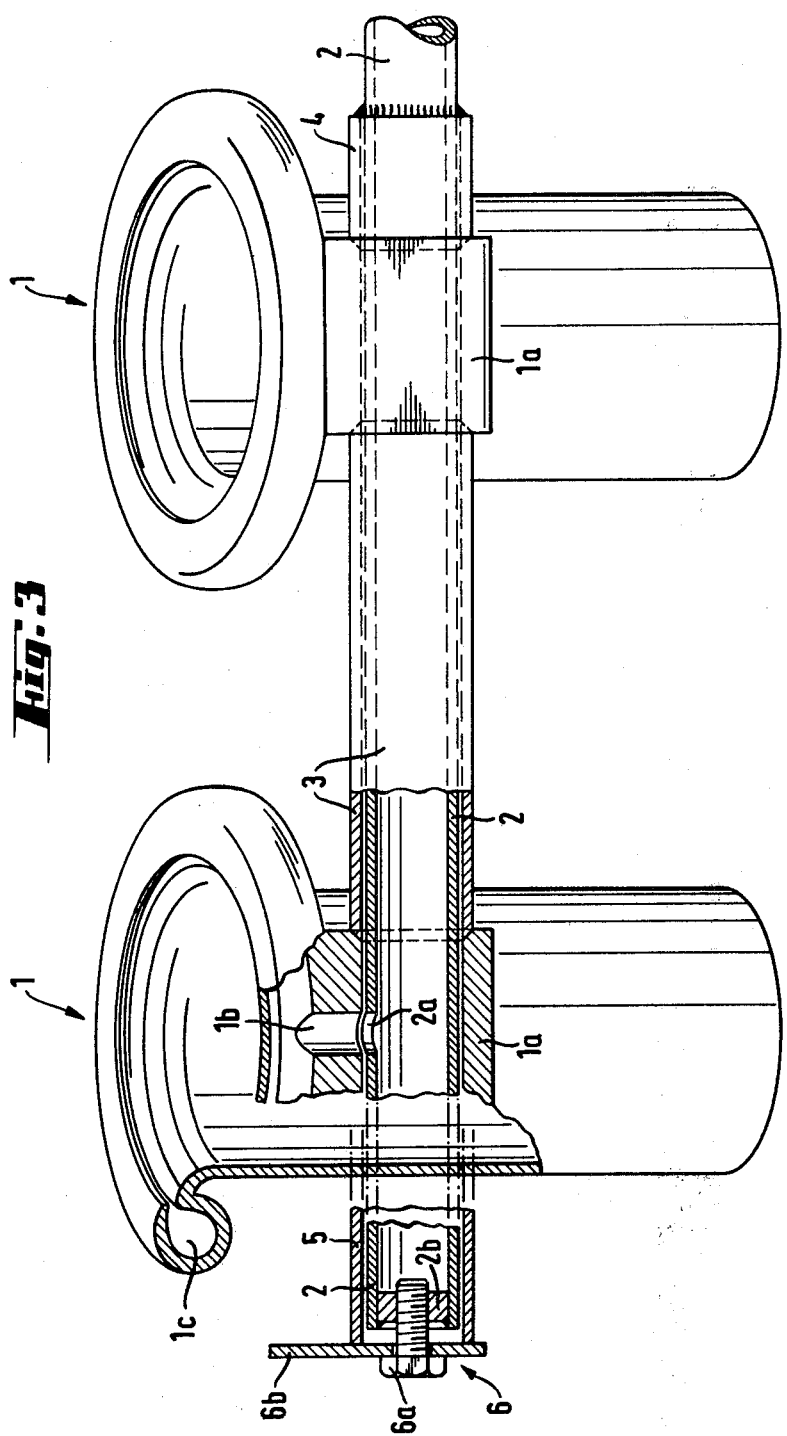

PRESSURE-GAS CONNECTION FOR DUST-LADEN GAS FILTERS

This invention relates to a pressure-gas connection for a reverse-flow cleaning device comprising a two-stage injector in flow communication with the pressure-gas feed conduit of dust-laden gas filters.

In dust-laden gas filters which are provided with such a reverse-flow device it is necessary to connect each injector individually to the pressure-gas feed conduit in a manner which is as gas-tight as possible.

Since particularly in the case of large filter systems thousands of injectors must be connected, a technically inexpensive embodiment which is simple to handle is desirable for economic reasons. Furthermore, the sealing should be effected with the simplest possible means since the individual sealing materials must always be adapted in their resistance to the gases to be filtered and/or their operating temperature.

The object of the present invention is to create a rapidly and easily attachable pressure-gas connection for injectors with which no additional seals are necessary.

This object is achieved in accordance with the invention in the manner that the connecting sockets (1a) of the injectors (1) of the first stage are inserted alternating with spacer sleeves (3), over the pressure-gas feed conduit (2) passing therethrough.

The advance in the art obtainable herewith is based on the following advantages. By the use of the pressure-gas feed conduit as a basic element for the pressure-gas connection of the injectors of the first stage, assembly by insertion of the individual parts on said basic element is extremely simple. The connection is effected with only a single clamping device even in the case of several injectors (in the filter systems customary in practice there are up to 10 injectors on a line). A screw type clamp can be used as a clamping device which can be manufactured in simple fashion and without any great technical expenditure. For the sealing, no additional seals are required since the sealing is effected by pressing the spacer sleeves against the end surfaces of the injector connecting sockets.

One illustrative embodiment of the invention is shown in the drawing in which:

FIG. 3 shows two injectors with the individual attachment parts placed on a pressure-gas feed conduit, partially in section.

Figure 1:
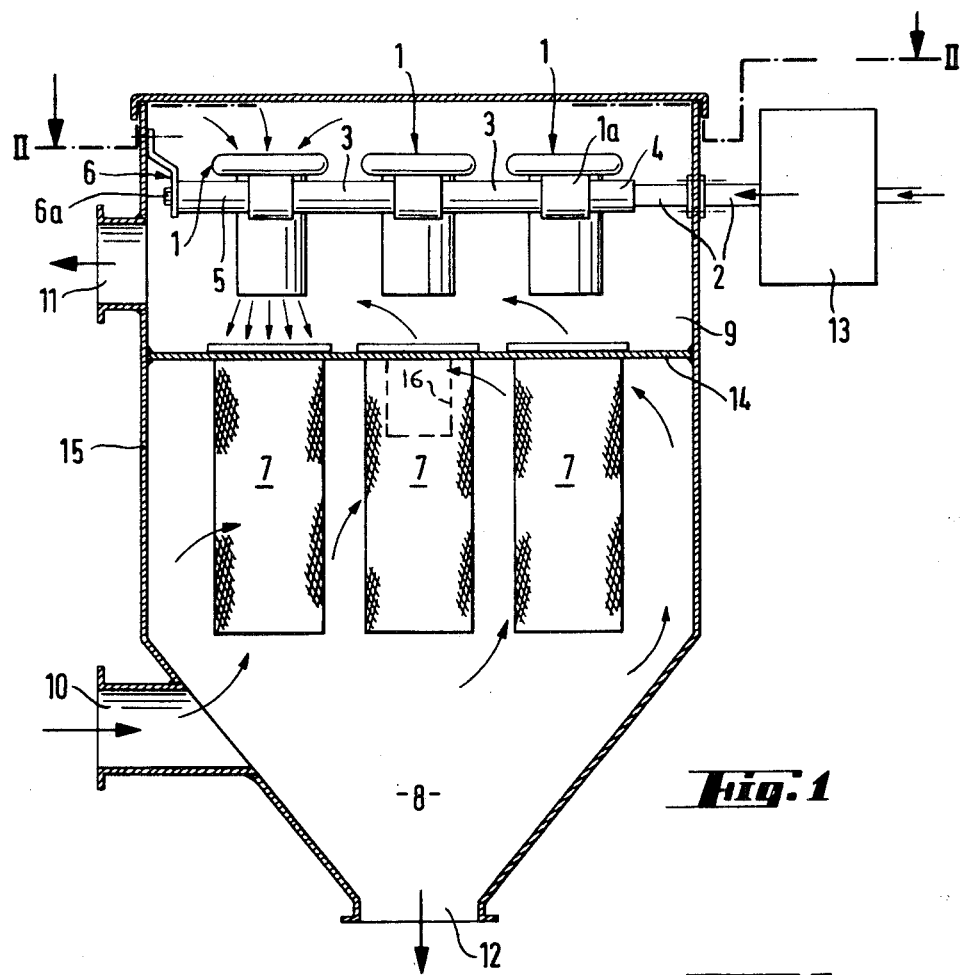
FIG. 1 is a cross section through a dust-laden gas filter.
Figure 2:
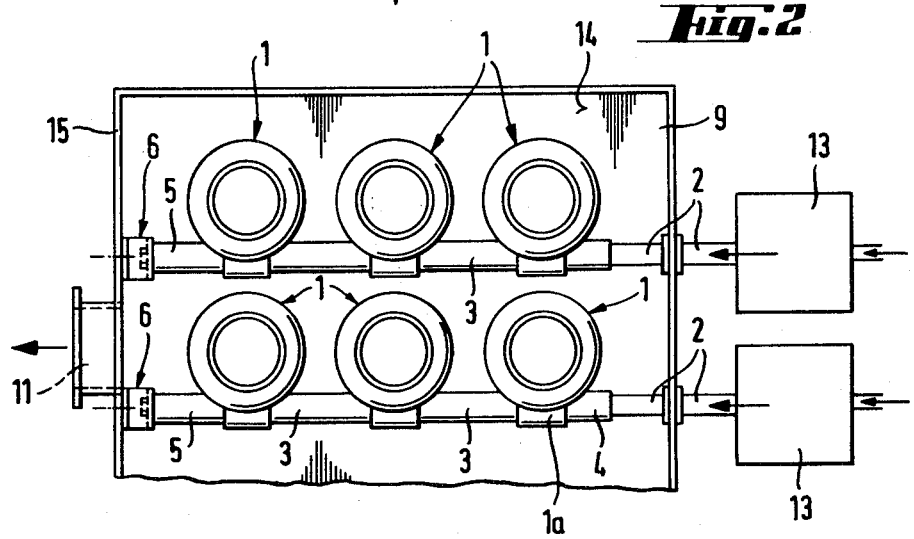
FIG. 2 shows the dust-laden filter of FIG. 1 seen from above in the plane below the upper cover, partially broken away.

In a housing 15 having an inlet duct 10 for the entrance of the dust-laden gas, an outlet duct 11 for the departure of the purified gas, and a dust outlet 12 for the removal of dust, filter elements 7 are fastened to a separating plate 14 arranged between the dust-laden gas space 8 and the purified gas space 9. Above the filter elements 7 there is arranged a reverse-flow device with a pressure-gas feed conduit 2 on which the injectors 1 of the first stage are mounted with spacer sleeves 3, a stationary sleeve 4 and a movable sleeve 5, and are held fast by means of a clamping device 6. From a pressure-gas generating unit (not shown) and a corresponding control device 13 pressure-gas pulses are produced, which cause, via the pressure-gas feed conduit 2, by means of the injectors 1, a flow of scavenging air in opposite direction to the filter flow so that the dust adhering to the outer surface of the filter elements 7 is blown off, drops down into the hopper of the housing 15, and is discharged through the dust outlet 12.

In accordance with the invention, the stationary sleeve 4 which is connected in a gas-tight manner to the conduit 2, is seated on the pressure-gas feed conduit 2. The connecting sockets 1a of the injectors 1, in each case alternate with a spacer sleeve 3, and are so aligned on the pressure-gas feed conduit 2 that the pressure-gas outlet hole 2a of the conduit 2 and the inlet hole 1b of the injector 1 are aligned with each other so that pressure gas can enter the ring channel 1c of the injector 1.

At the last injector 1 in each case an end sleeve 5 is placed over the pressure-gas feed conduit 2. This sleeve is of such a nature that it extends by a certain amount beyond the conduit 2. In this way it is possible to clamp the injectors 1 together aligned with the individual sleeves 3 and 5 by means of the clamping device 6. The clamping device 6 may suitably comprise an ordinary hexagon head screw as customary in machine construction, which is screwed into a plug 2b anchored in the pressure gas feed conduit 2. The head 6a of the screw is clamped against a holding plate 6b which rests against the end of the movable end sleeve 5. The connecting sockets 1a of the injectors 1 and the sleeves 3 and 5 have an inside diameter such that, upon assembly, they can easily be inserted over the pressure gas feed conduit 2. In order, for reasons of economy, to be able to keep the clamping length as small as possible upon the clamping of the injectors 1 together with the sleeves 3 and 5 and nevertheless be able to obtain the required sealing force for the sealing at the points of contact between the connecting sockets 1a and the ends of the sleeves 3, 4 and 5, the ends of the sleeves 3, 4 and 5 and the ends of the openings in the injection sockets 1a adjacent the ends of sleeves 3, 4 and 5 are conically shaped.

Herein the word "string" means threaded, that is the connecting sockets 1a and spacer sleeves 3 are threaded on the conduit 2 (i.e. like beads on a string). The second stage injectors 16 are in the filters 7.

I claim:

1. In a filter apparatus comprising a housing having a gas inlet and a gas outlet and having therein a plurality of filter elements for cleaning gas flowing therethrough and a two-stage injector device for reverse-flow purging of the filter elements comprising a plurality of injectors of a first stage and a cooperating plurality of injectors of a second stage positioned and arranged to direct a cleaning gas into said filter elements, and a pressure gas connection to a conduit which feeds a pressure gas to the injectors of the first stage, the improvement in the pressure gas connection wherein said conduit is a single continuous conduit, said plurality of injectors of said first stage include connecting sockets, respectively, spacer sleeves and said connecting sockets are disposed on said conduit in alternating arrangement, said conduit communicates with said plurality of injectors of said first stage via said connecting sockets, an end sleeve is disposed over a free end of said conduit, clamping means for clamping said end sleeve to said free end and holding fast said injectors of said first stage with said connecting sockets and said sleeves, for pressure-tightly securing said connecting sockets and said sleeves with respect to each other and closing off said end sleeve such that pressure gas in said conduit only communicates with said plurality of injectors of said first stage via said connecting sockets.

2. The filter apparatus according to claim 1, wherein said spacer sleeves are arranged between adjacent two of said injectors of the first stage and have an inside diameter which is somewhat larger than an outside diameter of said conduit.

3. The filter apparatus according to claim 1 or 2, wherein
a stationary sleeve is mounted on said conduit adjacent one end thereof,
said end sleeve comprises a movable end sleeve extending beyond said free end of said conduit,
said clamping means is operatively connected with said movable end sleeve so as to pressure-tightly press said connecting sockets and said sleeves in an axial direction against said stationary sleeve.

4. The filter apparatus according to claim 3, wherein
said clamping means is formed as a screw having a threaded part and a head,
a plug is positioned in said free end of said conduit,
said clamping means includes a holding plate resting against a free end of said movable end sleeve, said holding plate comprising means for said closing off of said end sleeve,
said threaded part of said screw is screwed into said plug and said head of said screw is clamped against said holding plate.

5. The filter apparatus according to claim 3, wherein
said stationary sleeve, said connecting sockets, said spacer sleeves, and said movable end sleeve each have ends which are conically formed and complementarily engage with each other in said alternating arrangement.

6. The filter apparatus according to claim 5, wherein each of said connecting sockets is formed with a hole,
said conduit is formed with a plurality of holes aligned with said holes of said connecting sockets, respectively.

7. The filter apparatus according to claim 1, wherein said clamping means clamps said connecting sockets and said sleeves against each other.

* * * * *